(12) United States Patent
Chung et al.

(10) Patent No.: US 8,421,739 B2
(45) Date of Patent: Apr. 16, 2013

(54) APPARATUS AND METHOD OF DRIVING DISCHARGE TUBE LAMP AND LIQUID CRYSTAL DISPLAY USING THE SAME

(75) Inventors: In Jae Chung, Kumi-shi (KR); Jong Dae Kim, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 2162 days.

(21) Appl. No.: 10/166,259

(22) Filed: Jun. 11, 2002

(65) Prior Publication Data

US 2003/0151601 A1 Aug. 14, 2003

(30) Foreign Application Priority Data

Feb. 9, 2002 (KR) .................................. 2002-7744

(51) Int. Cl.
*G09G 3/36* (2006.01)
*G09G 5/10* (2006.01)
(52) U.S. Cl.
USPC ........................................... 345/102; 345/690
(58) Field of Classification Search ............... 345/87, 345/102, 690–693; 315/291, 307, 224
See application file for complete search history.

(56) References Cited

U.S. PATENT DOCUMENTS

| 6,114,814 | A  | * | 9/2000 | Shannon et al. | 315/219 |
|6,157,143 | A  | * | 12/2000 | Bigio et al. | 315/307 |
| 6,239,558 | B1 | * | 5/2001 | Fujimura et al. | 315/307 |
| 6,636,190 | B2 | * | 10/2003 | Hirakata et al. | 345/74.1 |
| 2002/0122030 | A1 | * | 9/2002 | Stiens et al. | 345/178 |
| 2003/0160574 | A1 | * | 8/2003 | Gray | 315/291 |

FOREIGN PATENT DOCUMENTS

KR 2001-17397 A 3/2001

* cited by examiner

*Primary Examiner* — Srilakshmi K Kumar
(74) *Attorney, Agent, or Firm* — McKenna Long & Aldridge LLP

(57) ABSTRACT

A burst mode inverter that drives a discharge tube lamp in a manner that produces more emissions. A DC power supplier produces DC power. An inverter converts that DC power to AC power having a Pulse Width Modulated frequency that is between 2 and 3 times the system's frame frequency. A duty cycle controller controls the duty-on-time of the Pulse Width Modulation frequency so as to be with the range of about 40% to 100%.

14 Claims, 22 Drawing Sheets

HIGH VOLTAGE ELECTRODE

LOW VOLTAGE ELECTRODE

HIGH VOLTAGE ELECTRODE

LOW VOLTAGE ELECTRODE

APPARATUS AND METHOD OF DRIVING DISCHARGE TUBE LAMP AND LIQUID CRYSTAL DISPLAY USING THE SAME

This application claims the benefit of Korean Patent Application No. P2002-7744, filed on Feb. 9, 2002, which is hereby incorporated by reference for all purposes as if fully set forth herein.

BACKGROUND OF THE INVENTION

1. Field of the Invention

The present invention relates to liquid crystal displays having discharge tube lamps. More particularly, the present invention relates to driving such lamps.

2. Description of the Related Art

Because liquid crystal displays (LCDs) are often lightweight and slim, and have low power consumption, LCDs are often used in office automation equipment, audio/video equipment, and as computer displays. LCDs operate by controlling the amount of light that is transmitted through a liquid crystal based on video signals applied to a plurality of control switches. The video signals enable LCD devices to display desired images on a screen.

To display images, LCD devices typically require a backlight as a light sources. For example, cold cathode fluorescent tubes (CCFL) are commonly backlights. CCFL sources operate according to the cold emission phenomenon, i.e., electron emission caused by a strong electric field applied to the surface of a cathode. CCFL sources provide low heat emission, high brightness, long life, and can produce full color images. CCFL sources may be used in light guide systems, direct illumination systems, and reflection plate systems. Thus, CCFL are readily adopted to the needs a particular application.

CCFL sources are driven by high voltage AC power. High voltage AC power is obtained by boosting AC power using piezoelectric transformers (not shown) after DC power from a DC power supplier (not shown) has been converted to AC power by inverters (not shown).

Inverters that supply AC power to CCFL sources may be classified as either Continuous Mode Inverters or Burst Mode Inverters.

Continuous Mode Inverters supply a continuous AC waveform to CCFL sources. Burst Mode Inverters periodically supply Pulse Width Modulation (PWM) controlled AC waveforms to CCFL sources.

Referring to FIG. 1, the brightness of a CCFL source when driven by a Continuous Mode Inverter is proportional to the amplitude (a) of the electric power. As illustrated in FIG. 2, Continuous Mode Inverter output waveforms appear to be concentrated within a spectrum (A) comprised of a single frequency (f0) when converted by the Fourier Transform, reference equation 1.

$$f(t) = \frac{a_0}{2} + \sum_{n=0}^{\infty} A_n \cos(n\omega_0 t) \quad (1)$$

$$f(t) = A\cos(n\omega_0 t) \quad (2)$$

In the present example, $\omega_o$, the angular frequency=$2\pi/t_o$, n=the harmonic value, the Fourier Coefficients $a_0=0$ (dc component of the output waveform), and $A_n=A$ (amplitude of the output waveform).

The Fourier Coefficients $a_0$ and $A_n$ may be substituted into the Fourier series of equation 1 to provide the resultant equation 2 that describes the frequency spectrum shown in FIG. 2. Continuous Mode Inverters supply stable output waveforms with little loss when inducing AC gas discharges within CCFL sources.

Continuous Mode Inverters continuously supply AC power to CCFL sources, even when the liquid crystal panel is not driven. Accordingly, Continuous Mode Inverters cause CCFL sources to consume a relatively large amount of power. Also, the brightness adjustment range of the CCFL source is narrow because the adjustment range is dependent upon the amplitude (a) of the output waveform supplied from the inverter.

One approach to overcoming the deficiencies of CCFL sources driven by Continuous Mode Inverters is to use Burst Mode Inverters.

The Burst Mode Inverter can reduce power consumption and provide greater control of the brightness of CCFL sources. Referring to FIG. 3, a duty-on-time (duty cycle), τ, of the output waveform from a Burst Mode Inverter may be expressed as a ratio of, and may be adjusted relative to, a predetermined Pulse Width Modulated (PWM) frequency, Tp. While strictly speaking Tp is a time period, since time periods are reciprocals of frequencies, the following refers to PWM frequencies, thus following common terminology. The PWM frequency thus corresponds to a sequence of time periods in which a transistor (not shown) disposed between the DC power source and the inverter can be turned on and off. The PWM frequency thus controls the switching times that DC power supplied from the DC power source can be switched by the inverter. The duty-on-time (or duty cycle) corresponds to the amount of time in which the transistor is turned on during one period of the PWM frequency.

The output waveform of the AC power supplied from the Burst Mode Inverter may be converted by a Fourier Transform to produce the frequency spectrums illustrated in FIGS. 4 and 5.

Since the Burst Mode Inverter output waveform provides power to the CCFL source in accordance with the ratio of the duty-on-time with respect to the PWM frequency, harmonic components provide the frequency range required to drive the CCFL source.

FIG. 4 illustrates a frequency spectrum of the Burst Mode Inverter output waveform defined by equation 1, wherein the ratio of the duty-on-time to one period of the PWM frequency Tp is 1:5, i.e., the duty-on-time is 20% of one period of the PWM frequency. Fourier coefficients in the above equation 1 may be briefly defined as shown below:

$$a_0 = \frac{A\tau}{Tp} = c \text{ component}$$

$$a_n = \frac{2}{Tp}\int_0^T A\cos\left(2\pi n \frac{t}{Tp}\right)dt = \frac{A}{\pi n}\sin\left(2\pi n \frac{t}{Tp}\right)$$

$$b_n = \frac{2}{Tp}\int_0^T A\sin\left(2\pi n \frac{t}{Tp}\right)dt = \frac{A}{\pi n}\left(1 - \cos\left(2\pi n \frac{t}{Tp}\right)\right)$$

$$[n = 1, 2, 3, 4, \ldots]$$

The fourier coefficients shown above may be alternately expressed in plural exponent format, as illustrated below:

$$c_n = \frac{1}{Tp}\int_0^T Ae^{-jn\frac{2\pi n}{Tp}}dt = \frac{A}{jn2\pi}\left(1 - e^{-jn\frac{2\pi\tau}{Tp}}\right) = \frac{A\tau}{Tp}e - jn\frac{\pi\tau}{Tp}\frac{\sin\left(\frac{n\pi\tau}{Tp}\right)}{\frac{n\pi\tau}{Tp}}$$

Further, the Fourier coefficients expressed in plural exponent form as shown above may be briefly defined as illustrated below:

$$c_0 = \frac{A\tau}{Tp}$$

$$|c_0| = \frac{A\tau}{Tp}\left|\frac{\sin\left(\frac{n\pi\tau}{Tp}\right)}{\frac{n\pi\tau}{Tp}}\right|$$

$$[n = 1, 2, 3, \ldots]$$

The magnitude of the spectrums illustrated in FIGS. 4 and 5 are proportional to the duty-on-time (duty cycle) and are inversely proportional to the PWM frequency. Differences in frequencies of each spectrum are inversely proportional to the PWM frequency.

Referring to FIG. 4, the index of dispersion, R, is defined as the ratio of the frequency magnitude at the central region of the frequency spectrum having the largest value, $f_0$, to the frequency magnitude of a first harmonic, $f_1$, most closely adjacent to spectrum at $f_0$, as shown in equation 3, below.

$$\text{index of dispersion } (R) = \frac{f_1}{f_0} = 93\% \quad (3)$$

Accordingly, the index of dispersion represents the concentration of spectrum harmonics within a specific frequency range. As the index of dispersion decreases, the concentration of spectrum harmonics in a specific frequency range increases. Likewise, as the index of dispersion increases, the concentration of spectrum harmonics in a specific frequency range decreases.

Still referring to FIG. 4, with an index of dispersion of 93%, the Burst Mode Inverter output waveform supplied to the CCFL source is dispersed over many frequency ranges. Accordingly, electric current components within the output waveform enable the CCFL source to produce a stable glow discharge.

The electric current components within the output waveform do not affect the normal glow discharge inside the CCFL source nor are they consumed in any space discharge between the CCFL source and its surroundings (such as lamp housing and space which are not shown). However, a space discharge phenomenon is prevalent near the high voltage terminal of CCFL source, to which AC power is supplied. Briefly, the space discharge phenomenon occurs when mercury, Hg, ionized within the CCFL source, migrates on a large scale from the high voltage terminal towards a low voltage terminal of the CCFL source.

If the CCFL source is driven for long periods of time, the space discharge phenomenon is also sustained for long periods of time. Accordingly, all of the mercury atoms inside the CCFL source undergo large scale migration from the high voltage terminal toward the low voltage terminal. To emit light, mercury undergoes UV light emitting chemical reactions including ionization, excitation, etc. Since mercury within the CCFL source migrates towards the low voltage terminal, more mercury is accumulated near the low voltage terminal of the CCFL tube compared to mercury accumulation near the high voltage terminal. Accordingly, a deviation in the brightness within the CCFL tube results and the high voltage terminal of the CCFL source appears to be darker than the low voltage terminal.

FIG. 5 illustrates a spectrum of the Burst Mode Inverter output waveform defined by equation 1, wherein the ratio of the duty-on-time to one period of the PWM frequency is 3:Tp, i.e., the duty-on-time is 34% of one period of the PWM frequency.

The index of dispersion in the frequency spectrum of the output waveform shown in FIG. 5, calculated similarly with respect to the frequency spectrum in FIG. 4, is 83%. With an index of dispersion of 83%, the Burst Mode Inverter output waveform supplied to the CCFL source is dispersed over many frequency ranges. Accordingly, electric current components within the output waveform enable the CCFL source to produce a stable glow discharge.

The electric current components within the output waveform do not affect the normal glow discharge inside the CCFL nor are they consumed in any space discharge between the CCFL and its surroundings (such as lamp housing and space which are not shown). However, the space discharge phenomenon is prevalent near the high voltage terminal of the CCFL where mercury, Hg, ionized within the CCFL sources moves from the high voltage terminal to a low voltage terminal of the CCFL source. As described above, a deviation in brightness occurs in the CCFL source.

As the duty-on-time ratio decreases, power consumption is of the CCFL source is reduced. However, as described above, mercury migration inside CCFL sources deleteriously reduces its operational life. Additionally, as the PWM frequency increases, the CCFL source become less reliable as it may not turn on because the electric current required to produce discharge is not adequately supplied.

SUMMARY OF THE INVENTION

Accordingly, the present invention is directed to provide an apparatus and method of driving a discharge tube lamp that is capable of minimizing a deviation in brightness occurring when driving a CCFL using a burst mode inverter, and liquid crystal display using the same, that substantially obviates one or more of the problems due to limitations and disadvantages of the related art.

To achieve these and other advantages and in accordance with the purpose of the present invention, as embodied and broadly described, a driving apparatus of a discharge tube lamp according to an embodiment of the present invention includes a DC power supplier for producing DC power; an inverter for converting the DC power to AC power, wherein the inverter responds to a Pulse Width Modulation frequency to modulate the DC power to produce the AC power; and a controller for generating the Pulse Width Modulation frequency such that the Pulse Width Modulation frequency has a duty-on-time between about 40% to 100%.

In the driving apparatus, further comprising at least one discharge tube for being driven by AC power supplied from the inverter.

In the driving apparatus, the controller receives a frame frequency, and wherein the Pulse Width Modulation frequency is between 2 and 3 times the frame frequency.

In the driving apparatus, the duty-on-time of the Pulse Width Modulation frequency is 40% and the Pulse Width Modulation frequency is three times the frame frequency.

In the driving apparatus, the duty-on-time of the Pulse Width Modulation frequency is in the range of 50% to 100% and the Pulse Width Modulation frequency is twice the frame frequency.

A driving method of a discharge tube lamp according to another aspect of the present invention includes a producing DC power; generating a Pulse Width Modulation frequency having a duty-on-time between about 40% to 100%; and utilizing the Pulse Width Modulation frequency to convert the DC power into AC power to be applied to the discharge tube lamp.

In the driving method, the controller receives a frame frequency, and wherein the Pulse Width Modulation frequency is 2 to 3 times the frame frequency.

In the driving method, the duty-on-time is in the range of 50% to 100% and the Pulse Width Modulation frequency is twice the frame frequency.

In the driving method, the duty-on-time of the Pulse Width Modulation frequency is 40% and the Pulse Width Modulation frequency is three times the frame frequency.

A liquid crystal display according to still another aspect of the present invention includes a liquid crystal display panel; a DC power supplier for producing DC power; an inverter for converting the DC power to AC power, wherein the inverter responds to a Pulse Width Modulation frequency to modulate the DC power to produce the AC power; a controller for generating the Pulse Width Modulation frequency such that the Pulse Width Modulation frequency has a duty-on-time between about 40% to 100%; and at least one discharge tube which turns on in accordance with the AC power supplied from the inverter to irradiate light to the liquid crystal display panel.

In the liquid crystal display, the controller receives a signal having a frame frequency, and wherein the Pulse Width Modulation frequency is within the range of 2 to 3 times the frame frequency.

In the liquid crystal display, the duty-on-time of the Pulse Width Modulation frequency is 40% and the Pulse Width Modulation frequency is three times the frame frequency.

In the liquid crystal display, the duty-on-time of the Pulse Width Modulation frequency is in the range of 50% to 100% and the Pulse Width Modulation frequency is twice the frame frequency.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 15S is a photograph taken of the mercury distribution between 220 mm~225 mm from the high voltage electrode of the CCFL shown in FIG. 15A;

DETAILED DESCRIPTION OF THE ILLUSTRATED EMBODIMENTS

Reference will now be made in detail to embodiments of the present invention, examples of which are illustrated in the accompanying drawings.

With reference to FIGS. 6 to 18, embodiments of the present invention are explained as follows.

Figure 6:
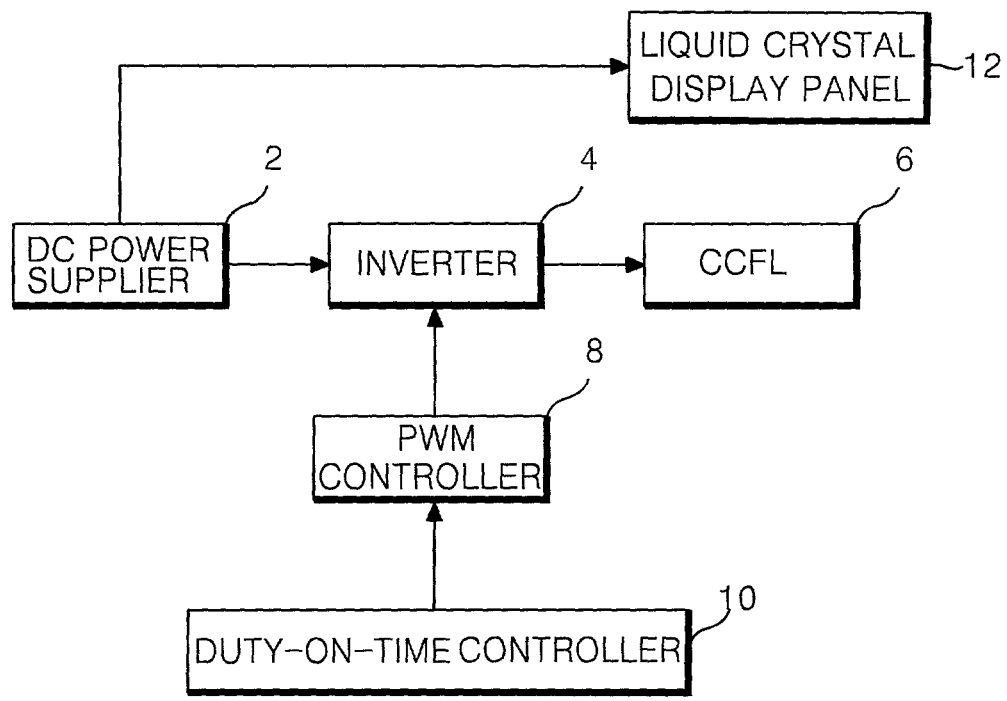
FIG. 6 illustrates a block diagram representing a liquid crystal display having a driving apparatus including a Burst Mode Inverter according to a first embodiment of the present invention.

Referring to FIG. 6, a driving apparatus according to an embodiment of the present invention having a discharge tube lamp includes a DC power supplier 2 for supplying DC power, an inverter 4 for converting the DC power to AC power, a Cold Cathode Fluorescent Lamp 6 (CCFL) for receiving the AC power from the inverter 4 and generating light (not shown), and a PWM controller 8 for controlling the DC power to the inverter 4 by a Pulse Width Modulation PWM method.

The DC power supplier 2 receives power from a system portion (not shown), generates power for driving a liquid crystal panel 12, and supplies the generated power to a liquid crystal panel 12. More specifically, the DC power supplier converts the power supplied from the system portion to a voltage type suitable for driving a discharge tube lamp and then supplies the converted voltage to the inverter 4.

The liquid crystal panel 12 controls the transmittance of the light that is irradiated from the CCFL 6 in accordance with video signals that are applied to a plurality of control switches arranged in a matrix pattern.

The inverter 4 converts the DC power supplied from the DC power supplier 2 to the AC power. The DC power supplied from the DC power supplier is modulated according to a PWM control method imposed by a PWM controller 8. A piezo-electric transducer (not shown) for boosting low voltage DC power to the high voltage AC power may be included within inverter 4. The piezo-electric transducer boosts the AC power supplied from the inverter 4 in an amount proportional to a ratio of a number of primary coils to a number of secondary coils, and supplies the boosted AC power to the CCFL 6.

By a PWM method, the PWM controller 8 controls a transistor provided between the DC power supplier 2 and the inverter 4. Accordingly, the transistor transmits DC power supplied from the DC power supplier 2 to the inverter 4 by the control of the PWM controller 8. The PWM controller 8 additionally includes a duty-on-time controller 10 for controlling the duty proportion of the transistor.

The duty-on-time controller 10 multiplies a frame frequency of a liquid crystal display (LCD) within a range of about 2 to about 3 times the frame frequency required to drive the LCD to generate a PWM frequency. Moreover, the duty-on-time controller 10 adjusts the duty-on-time proportion of the PWM frequency to be within the range of about 40% to 100% of one period of the PWM frequency. The adjusted PWM frequency is supplied to the PWM controller 8. The duty-on-time controller 10 may be integrated into the PWM controller 8.

The CCFL 6 receives the boosted AC power supplied from the secondary coil of the piezo-electric transducer, produces a gas discharge, and emits light.

The discharge tube lamp may be driven according to a driving method that includes supplying DC power from the DC power supplier 2 via the transistor under the control of the PWM controller 8 to the inverter 4. The DC power supplied via the transistor is converted to AC power by the inverter 4, the AC power may be boosted by the ratio of the numbers of primary and secondary coils within the piezo-electric transducer integrated with the inverter. Electrons supplied via the boosted AC power and the mercury, Hg, within the CCFL collide with each other in the CCFL and UW light, resultant of chemical reactions such as ionization of mercury, excitation, etc., is emitted.

Figure 7:
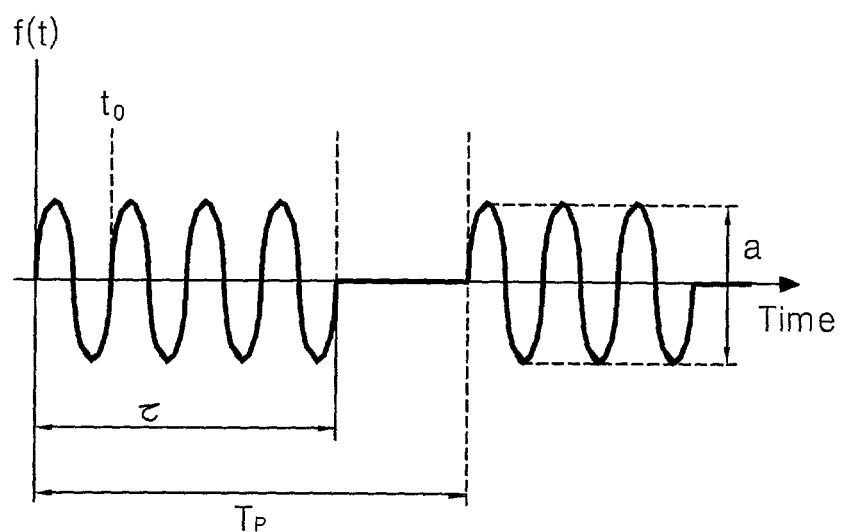
FIG. 7 illustrates a waveform diagram of an output waveform from a Burst Mode Inverter according to the present invention.

Referring to FIG. 7, PWM frequency is multiplied within a range of about 2 to about 3 times the frame frequency used in an LCD. Moreover, the proportion of the duty-on-time is adjusted to be within the range of about 40% to 100% of one period, Tp, of the PWM frequency. The PWM frequency corresponds to the period of time required to turn on off the transistor disposed between the DC power supplier 2 and the inverter 4. The duty-on-time, $\tau$, corresponds to the period of time in which the transistor is turned on in one period, Tp, of the PWM frequency.

Output waveforms of the Burst Mode Inverter according to the principles of the present invention, converted by Fourier Transform using equation 4, below, are illustrated as frequency spectrums in FIGS. 8 to 11.

$$|C_n| = \frac{A\tau}{Tp}\left|\frac{\sin\left(\frac{n\pi\tau}{Tp}\right)}{\frac{n\pi\tau}{Tp}}\right| \quad (4)$$

$$[n = 1, 2, 3, \ldots]$$

Figure 8:
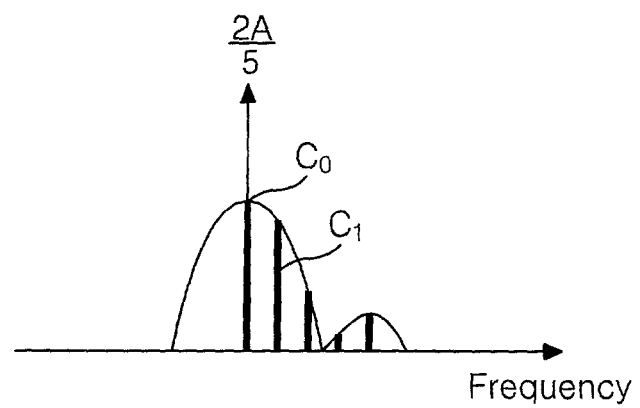
FIG. 8 illustrates a frequency spectrum of the output waveform of the Burst Mode Inverter with the duty-on-time of 40% used in a Burst Mode Inverter driving method of according to the present invention.

The frequency spectrum shown in FIG. 8 may be obtained from the Burst Mode Inverter output waveform according to a first embodiment of the present invention. According to the first embodiment, the PWM frequency is multiplied by two times the frame frequency used in driving the LCD and the ratio of the duty-on-time to one period of the PWM frequency is 2/5: Tp, i.e., $\tau$ is adjusted to be 40% of one period of the PWM frequency. The magnitude of each frequency in the spectrum is obtained by the following equations 5, substituting each coefficient to the equation 4.

$$|C_0| = a_0 = \frac{A\tau}{Tp} = \frac{2A}{5} \quad (5)$$

$$|C_1| = \frac{2A}{5}\frac{\sin 2\pi/5}{2\pi/5} = \frac{0.951A}{\pi}$$

$$|C_2| = \frac{2A}{5}\frac{\sin 4\pi/5}{\sin 4\pi/5} = \frac{0.588A}{2\pi}$$

Accordingly, the index of dispersion, R, of the frequency magnitude at the central region of the frequency spectrum having the largest value in the frequency spectrum, $C_0$, and the frequency magnitude of a first harmonic, $C_1$, most closely adjacent to the frequency at the central region of the spectrum, $C_0$, becomes 75.7% according to equation 6, below.

$$\text{index of dispersion } (R) = \frac{C_1}{C_0} = \frac{0.951A/\pi}{2A/5} 75.7\% \quad (6)$$

The index of dispersion represents the concentration of spectrum harmonics within a specific frequency range. As the index of dispersion decreases, the concentration of spectrum harmonics in a specific frequency range increases. Likewise, as the index of dispersion increases, the concentration of spectrum harmonics in a specific frequency range decreases.

Figure 1:
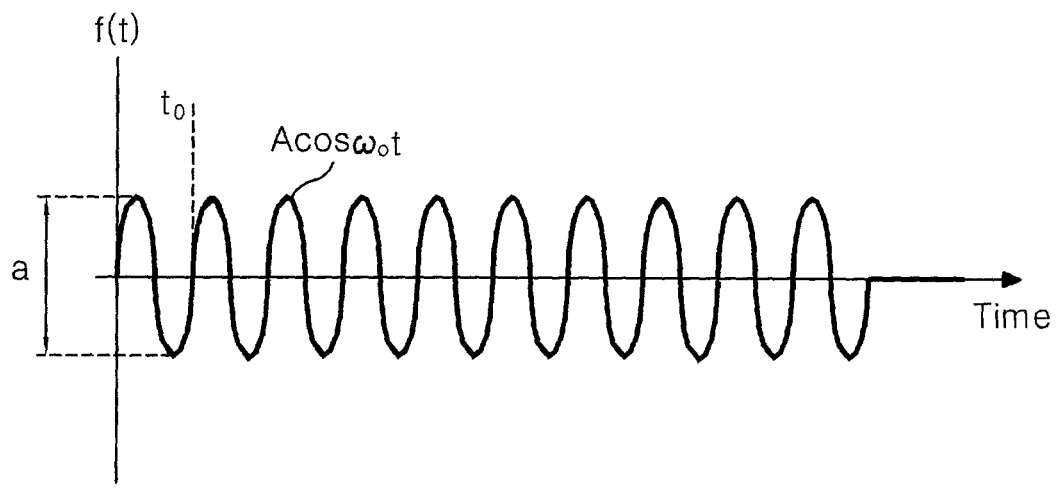
FIG. 1 illustrates a waveform diagram of an output waveform from a conventional Continuous Mode Inverter.
Figure 2:
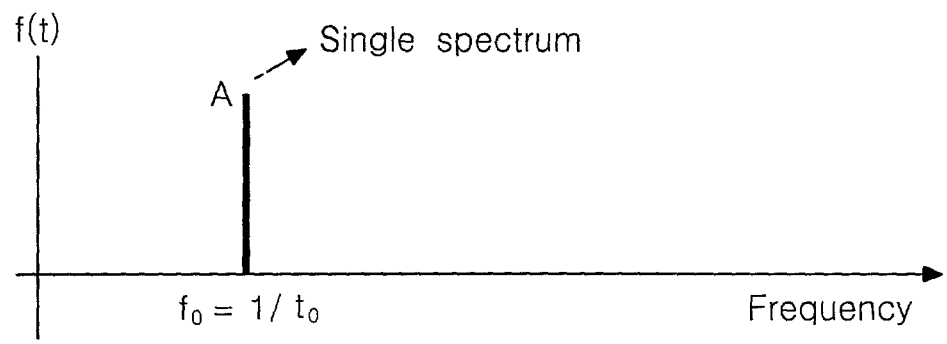
FIG. 2 illustrates a frequency spectrum of the output waveform of the Continuous Mode Inverter shown in FIG. 1.
Figure 3:
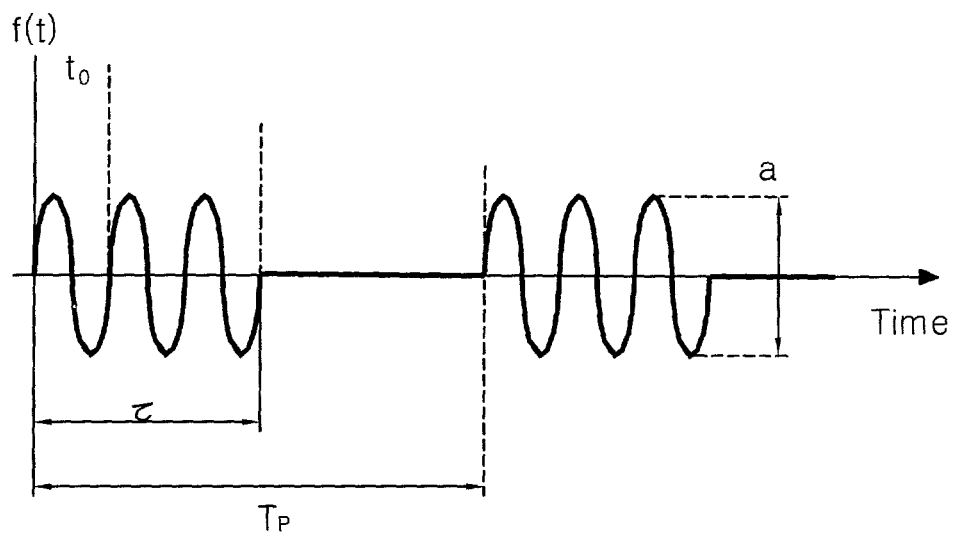
FIG. 3 illustrates a waveform diagram of an output waveform from a conventional Burst Mode Inverter.
Figure 4:
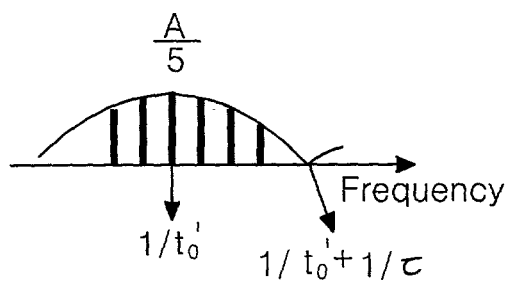
FIG. 4 illustrates a frequency spectrum of the output waveform of the Burst Mode Inverter shown in FIG. 3 with an duty-on-time of 20%.
Figure 5:
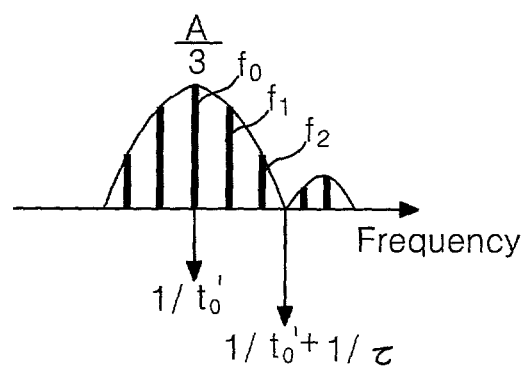
FIG. 5 illustrates a frequency spectrum of the output waveform of the Burst Mode Inverter shown in FIG. 3 with an duty-on-time of 34%.

The frequency range of the frequency spectrum produced by the Burst Mode Inverter of the first embodiment of the present invention, as indicated by the index of dispersion of 75.7%, is less dispersed than the frequency range of each frequency spectrum produced by a conventional Burst Mode Inverter having $\tau$ being 20% or 34% of Tp as shown in FIG. 4 or 5, respectively, and is also concentrated on the frequency range required by the CCFL. The Burst Mode Inverter output waveform according to the first embodiment is concentrated on the frequency range and has an index of dispersion that effects a glow discharge inside the CCFL while minimizing and/or eliminating space discharge between the CCFL and the surroundings (e.g., lamp housing, space, etc.).

In this way, a Burst Mode Inverter output waveform according to a first embodiment of the present invention delays and/or prevents mercury migration from the high voltage terminal of the CCFL to the low voltage terminal of the CCFL. By delaying and/or preventing the large scale migration of mercury within the CCFL, brightness may be made more uniform throughout operation of the CCFL.

Figure 9:
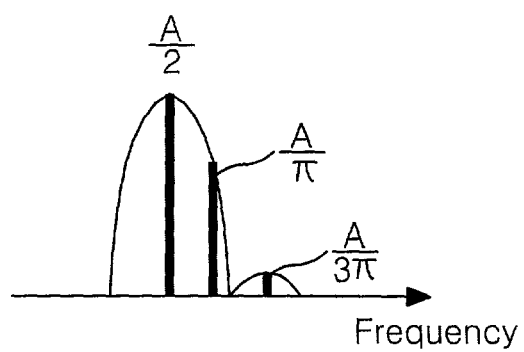
FIG. 9 illustrates a frequency spectrum of the output waveform of the Burst Mode Inverter with the duty-on-time of 50% in a Burst Mode Inverter driving method of according to the present invention.

The frequency spectrum shown in FIG. 9 may be obtained from the Burst Mode Inverter output waveform according to a second embodiment of the present invention. According to the second embodiment, the PWM frequency, Tp, is set equal to the frame frequency used in driving the LCD and the ratio of the duty-on-time to one period of the PWM frequency is 1/2: Tp, i.e., $\tau$ is adjusted to be 50% of one period of the PWM frequency. The magnitude of each frequency in the spectrum is obtained by means of the above mentioned equation 4.

Accordingly, the index of dispersion, R, of the frequency magnitude at the central region having the largest value in the frequency spectrum, $C_0$, and the frequency magnitude of a first harmonic, $C_1$, most closely adjacent to the frequency at the central region of the spectrum, $C_0$, becomes 63.7% according to equation 7, below.

$$\text{index of dispersion } (R) = \frac{C_1}{C_0} = \frac{A/\pi}{A/2} = 63.7\% \qquad (7)$$

The frequency range of the frequency spectrum produced by the Burst Mode Inverter of the second embodiment of the present invention, as indicated by the index of dispersion of 63.7%, is less dispersed than the frequency range of each frequency spectrum produced by a conventional Burst Mode Inverter having $\tau$ being 20% or 34% of Tp as shown in FIG. 4 or 5, respectively, and more concentrated on the frequency range required by the CCFL than the output waveform defined by the frequency spectrum in FIG. 8 of the Burst Mode Inverter having a duty-on-time of 2Tp/5. The Burst Mode Inverter output waveform according to the second embodiment is concentrated on the frequency range and has an index of dispersion that effects a glow discharge inside the CCFL while minimizing and/or eliminating space discharge between the CCFL and its surroundings (e.g., lamp housing, space, etc.).

In this way, a Burst Mode Inverter output waveform according to a second embodiment of the present invention delays and/or prevents mercury migration from the high voltage terminal of the CCFL to the low voltage terminal of the CCFL. By delaying and/or preventing the large scale migration of mercury within the CCFL, brightness may be made more uniform throughout operation of the CCFL.

Figure 10:
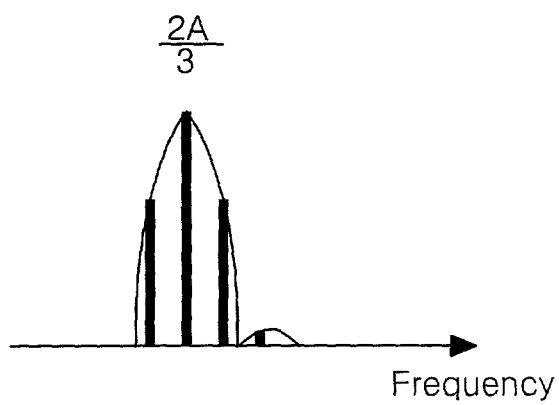
FIG. 10 illustrates a frequency spectrum of the output waveform of the Burst Mode Inverter with the duty-on-time of 67% in a Burst Mode Inverter driving method of according to the present invention.

The frequency spectrum shown in FIG. 10 may be obtained from the Burst Mode Inverter output waveform according to a third embodiment of the present invention. According to the third embodiment, the PWM frequency, Tp, is multiplied by two times the frame frequency used in driving the LCD and the ratio of the duty-on-time to one period of the PWM frequency is ⅔: Tp, i.e., $\tau$ is adjusted to be 67% of one period of the PWM frequency. The magnitude of each frequency in the spectrum is obtained by means of the above mentioned equation 4.

Accordingly, the index of dispersion, R, of the frequency magnitude at the central region having the largest value in the frequency spectrum, $C_0$, and the frequency magnitude of a first harmonic, $C_1$, most closely adjacent to the frequency at the central region of the spectrum, $C_0$, becomes 34%.

The frequency range of the frequency spectrum produced by the Burst Mode Inverter of the third embodiment of the present invention, as indicated by the index of dispersion of 34%, is less dispersed than the frequency range of each frequency spectrum produced by a conventional Burst Mode Inverter having $\tau$ being 20% or 34% of Tp as shown in FIG. 4 or 5, respectively, and more concentrated on the frequency range required by the CCFL than the output waveform defined by the frequency spectrum in FIGS. 8 and 9 of the Burst Mode Inverters having duty-on-times of 2Tp/5 and Tp/2, respectively. The Burst Mode Inverter output waveform according to the third embodiment is concentrated on the frequency range and has an index of dispersion that effects a glow discharge inside the CCFL while minimizing and/or eliminating space discharge between the CCFL and its surroundings (e.g., lamp housing, space, etc.).

In this way, a Burst Mode Inverter output waveform according to a third embodiment of the present invention delays and/or prevents mercury migration from the high voltage terminal of the CCFL to the low voltage terminal of the CCFL. By delaying and/or preventing the large scale migration of mercury within the CCFL, brightness may be made more uniform throughout operation of the CCFL.

Figure 11:
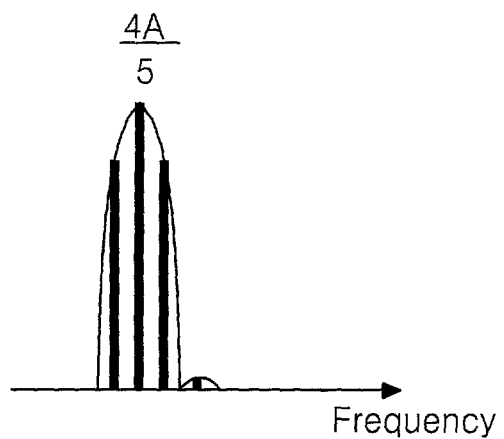
FIG. 11 illustrates a frequency spectrum of the output waveform of the Burst Mode Inverter with the duty-on-time of 80% in a Burst Mode Inverter driving method of according to the present invention.

The frequency spectrum shown in FIG. 11 may be obtained from the Burst Mode Inverter output waveform according to a fourth embodiment of the present invention. According to the fourth embodiment, the PWM frequency, Tp, is multiplied by four times the frame frequency used in the LCD and the ratio of the duty-on-time to one period of the PWM frequency is ⅘: Tp, i.e., $\tau$ is adjusted to be 80% of one period of the PWM frequency. The magnitude of each frequency in the spectrum is obtained by means of the above mentioned equation 4.

Accordingly, the index of dispersion, R, of the frequency magnitude at the central region having the largest value in the frequency spectrum, $C_0$, and the frequency magnitude of a first harmonic, $C_1$, most closely adjacent to the frequency at the central region of the spectrum, $C_0$, becomes 23%.

The frequency range of the frequency spectrum produced by the Burst Mode Inverter of the fourth embodiment of the present invention, as indicated by the index of dispersion of 23%, is less dispersed than the frequency range of each frequency spectrum produced by a conventional Burst Mode Inverter having $\tau$ being 20% or 34% of Tp as shown in FIG. 4 or 5, respectively, and more concentrated on the frequency range required by the CCFL than the output waveform defined by the frequency spectrum in FIGS. 8, 9, and 10 of the Burst Mode Inverters having duty-on-times of 2Tp/5, Tp/2, and 2Tp/3, respectively. The Burst Mode Inverter output waveform according to the fourth embodiment is concentrated on the frequency range and has an index of dispersion that effects a glow discharge inside the CCFL while minimizing and/or eliminating space discharge between the CCFL and its surroundings (e.g., lamp housing, space, etc.).

In this way, a Burst Mode Inverter output waveforn according to a fourth embodiment of the present invention delays and/or prevents that mercury migration from the high voltage terminal of the CCFL to the low voltage terminal of the CCFL. By delaying and/or preventing the large scale migration of mercury within the CCFL, brightness may be made more uniform throughout operation of the CCFL.

If the proportion of the duty-on-time is adjusted to be equal to Tp, the the same output waveform as the conventional Continuous Mode Inverter is supplied to CCFL.

Referring now to FIGS. 12 to 17, the migration of the mercury inside the CCFL driven by both a conventional Burst Mode Inverter and Burst Mode Inverters according to the first to fourth embodiment of the present invention (e.g., having duty-on-times of 40% to 100% of the PWM frequency and PWM frequencies multiplied by two or three times the frame frequency used in driving the LCD) will now be described.

Figure 12:
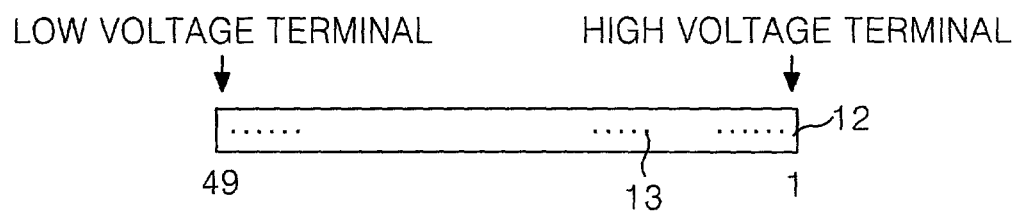
FIG. 12 illustrates a mercury distribution diagram representing the distribution of the mercury injected into a CCFL.

FIG. 12 shows the distribution of the mercury inside the CCFL prior to any substantial operation. As shown in FIG. 12, the mercury 13 is uniformly distributed near the high voltage terminal and the low voltage terminal of the CCFL 12. However, the mercury 13 near the high and low voltage terminals of the CCFL may be distributed differently in accordance with the duty-on-time to Tp ratio and/or the actual PWM frequency of the Burst Mode Inverter output waveform.

Figure 13A:
FIG. 13A is a photograph taken of the mercury distribution between 0 mm~5 mm from the high voltage electrode of a CCFL driven according to a conventional Burst Mode Inverter driving method.
Figure 13B:
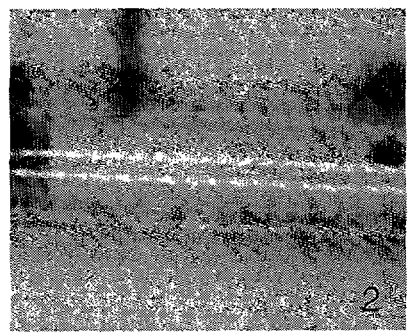
FIG. 13B is a photograph taken of the mercury distribution between 5 mm~10 mm from the high voltage electrode of the CCFL shown in FIG. 13A.
Figure 13C:
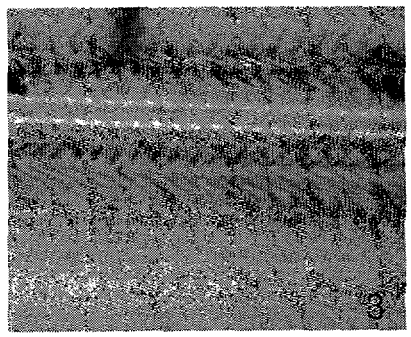
FIG. 13C is a photograph taken of the mercury distribution between 10 mm~15 mm from the high voltage electrode of the CCFL shown in FIG. 13A.
Figure 13D:
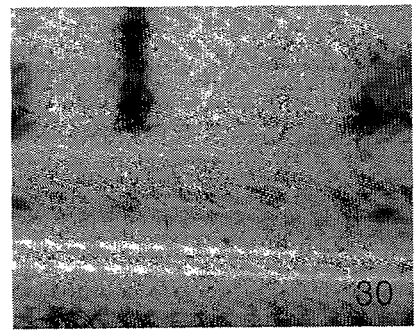
FIG. 13D is a photograph taken of the mercury distribution between 145 mm~150 mm from the high voltage electrode of the CCFL shown in FIG. 13A.
Figure 13E:
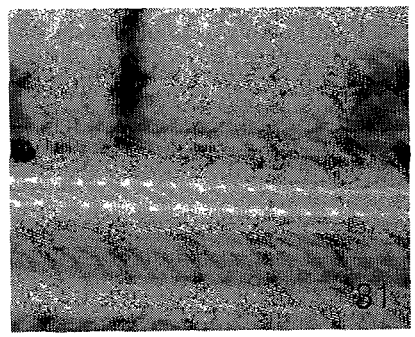
FIG. 13E is a photograph taken of the mercury distribution between 150 mm~155 mm from the high voltage electrode of the CCFL shown in FIG. 13A.
Figure 13F:
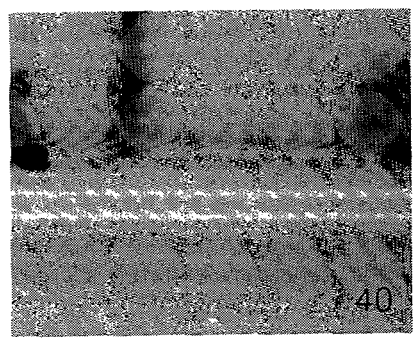
FIG. 13F is a photograph taken of the mercury distribution between 195 mm~200 mm from the high voltage electrode of the CCFL shown in FIG. 13A.
Figure 13G:
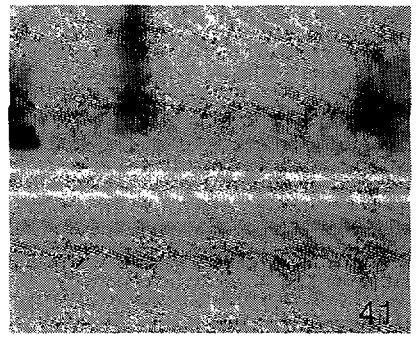
FIG. 13G is a photograph taken of the mercury distribution between 200 mm~205 mm from the high voltage electrode of the CCFL shown in FIG. 13A.
Figure 13H:
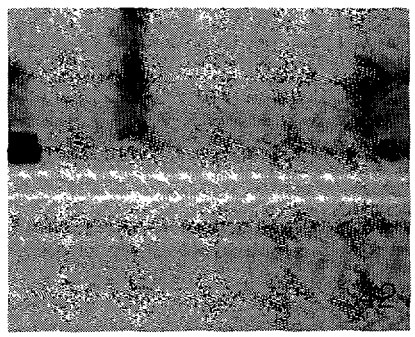
FIG. 13H is a photograph taken of the mercury distribution between 205 mm~210 mm from the high voltage electrode of the CCFL shown in FIG. 13A.
Figure 13I:
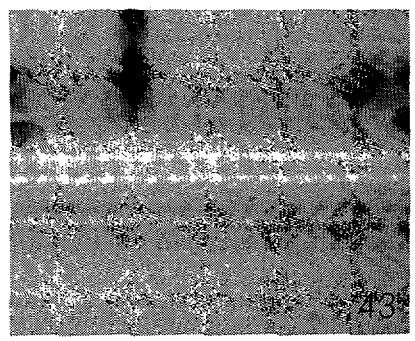
FIG. 13I is a photograph taken of the mercury distribution between 210 mm~215 mm from the high voltage electrode of the CCFL shown in FIG. 13A.
Figure 13J:
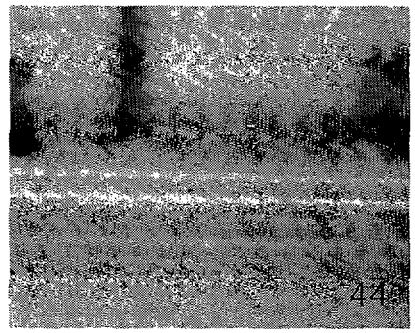
FIG. 13J is a photograph taken of the mercury distribution between 215 mm~220 mm from the high voltage electrode of the CCFL shown in FIG. 13A.
Figure 13K:
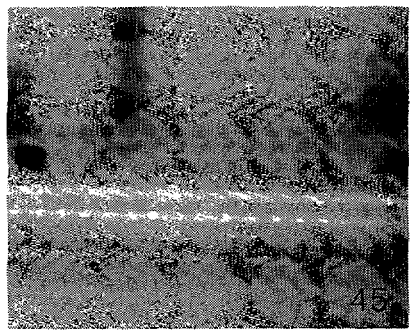
FIG. 13K is a photograph taken of the mercury distribution between 220 mm~225 mm from the high voltage electrode of the CCFL shown in FIG. 13A.
Figure 13L:
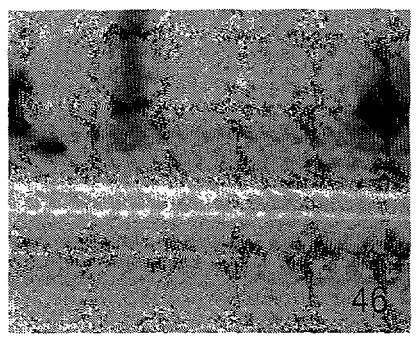
FIG. 13L is a photograph taken of the mercury distribution between 225 mm~230 mm from the high voltage electrode of the CCFL shown in FIG. 13A.
Figure 13M:
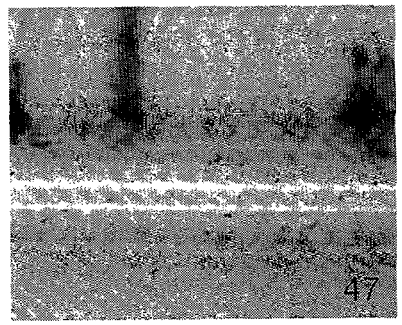
FIG. 13M is a photograph taken of the mercury distribution between 230 mm~235 mm from the high voltage electrode of the CCFL shown in FIG. 13A.
Figure 13N:
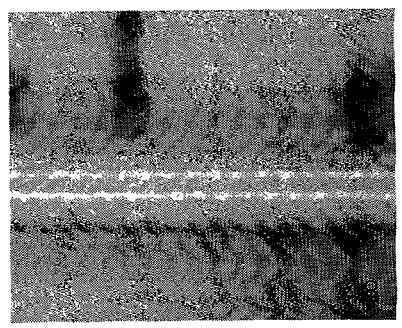
FIG. 13N is a photograph taken of the mercury distribution between 235 mm~240 mm from the high voltage electrode of the CCFL shown in FIG. 13A.
Figure 13O:
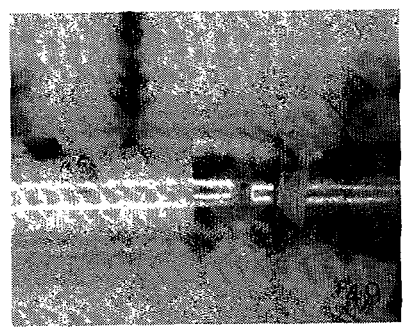
FIG. 13O is a photograph taken of the mercury distribution between 240 mm~245 mm from the high voltage electrode of the CCFL shown in FIG. 13A.

FIGS. 13A to 13O illustrate actual microphotographs of mercury distributions within a CCFL having an overall length of 254 mm and a gap of 5 mm. The black spots inside the CCFL indicate the presence of mercury 13. The CCFL shown in FIGS. 13A to 13O was driven for 307 hours by a Burst Mode Inverter output waveform having a PWM frequency of 280 Hz and a duty-on-time to Tp ratio of 37%. Such a mercury distribution may be schematically shown in FIG. 14.

Figure 14:
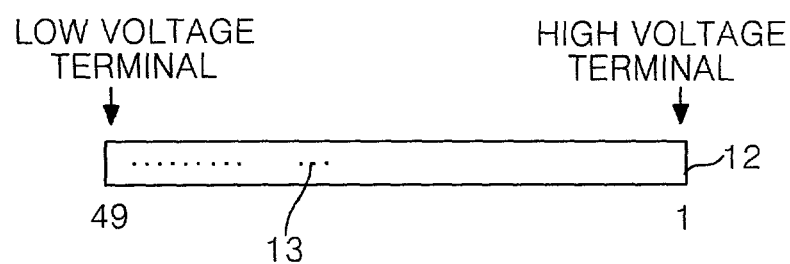
FIG. 14 schematically illustrates a sectional view of the mercury distribution shown in FIGS. 13A to 13O.

As shown in FIGS. 13A to 13O and 14, all the mercury 13 at the area near the high voltage terminal 13A to 13C of the CCFL 12 is located to the area near the low voltage terminal 13F to 13O. Accordingly, the mercury gradient in distribution between the area near the high voltage terminal and near the low voltage terminal of the CCFL 12 causes a deviation in brightness such that the area near the high voltage terminal of the CCFL appears darker than the area near the low voltage terminal.

Figure 15A:
FIG. 15A is a photograph taken of the mercury distribution between 0 mm~5 mm from the high voltage electrode of the CCFL according to a Burst Mode Inverter driving method of the present invention.
Figure 15B:
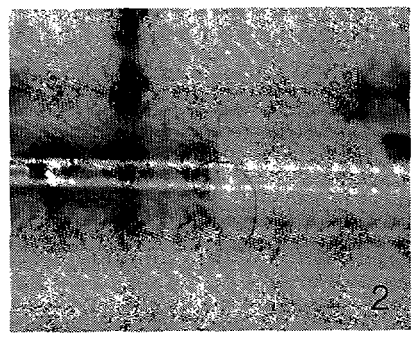
FIG. 15B is a photograph taken of the mercury distribution between 5 mm~10 mm from the high voltage electrode of the CCFL shown in FIG. 15A.
Figure 15C:
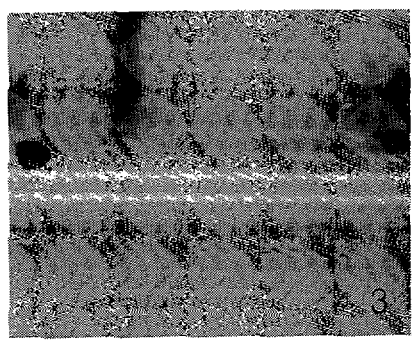
FIG. 15C is a photograph taken of the mercury distribution between 10 mm~15 mm from the high voltage electrode of the CCFL shown in FIG. 15A.
Figure 15D:
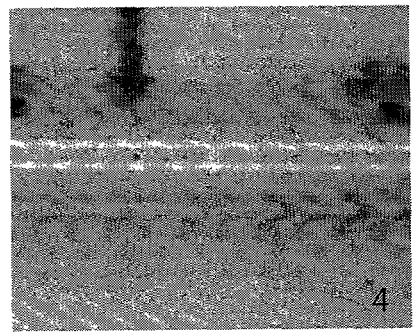
FIG. 15D is a photograph taken of the mercury distribution between 15 mm~20 mm from the high voltage electrode of the CCFL shown in FIG. 15A.
Figure 15E:
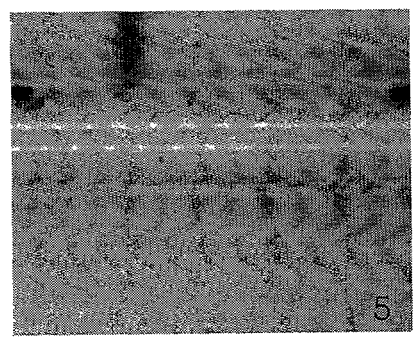
FIG. 15E is a photograph taken of the mercury distribution between 20 mm~25 mm from the high voltage electrode of the CCFL shown in FIG. 15A.
Figure 15F:
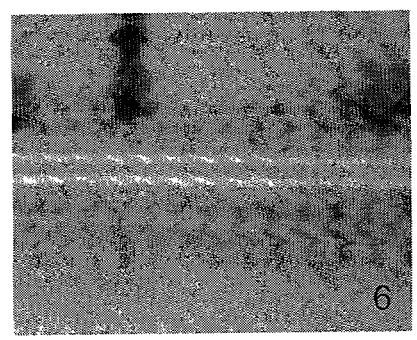
FIG. 15F is a photograph taken of the mercury distribution between 25 mm~30 mm from the high voltage electrode of the CCFL shown in FIG. 15A.
Figure 15G:
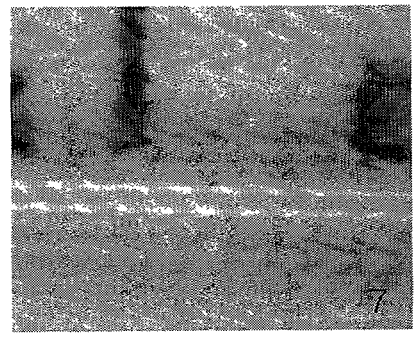
FIG. 15G is a photograph taken of the mercury distribution between 30 mm~35 mm from the high voltage electrode of the CCFL shown in FIG. 15A.
Figure 15H:
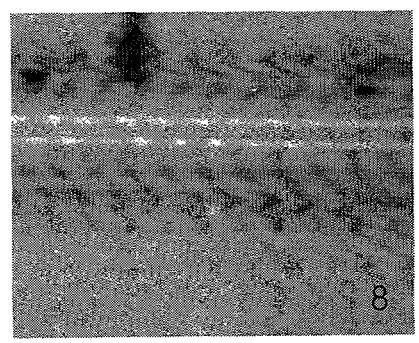
FIG. 15H is a photograph taken of the mercury distribution between 35 mm~40 mm from the high voltage electrode of the CCFL shown in FIG. 15A.
Figure 15I:
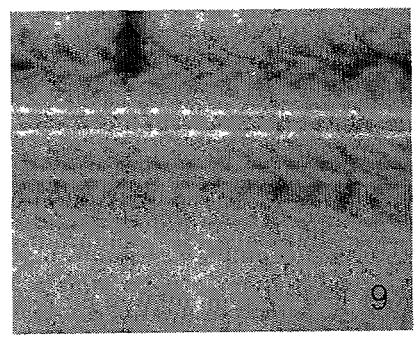
FIG. 15I is a photograph taken of the mercury distribution between 40 mm~45 mm from the high voltage electrode of the CCFL shown in FIG. 15A.
Figure 15J:
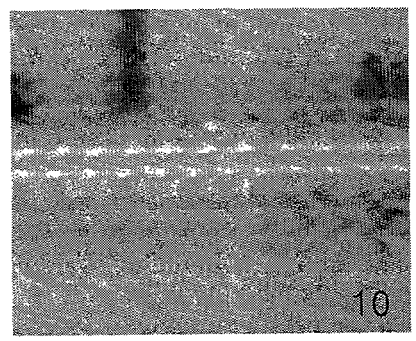
FIG. 15J is a photograph taken of the mercury distribution between 45 mm~50 mm from the high voltage electrode of the CCFL shown in FIG. 15A.
Figure 15K:
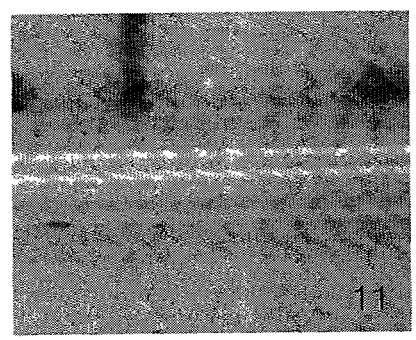
FIG. 15K is a photograph taken of the mercury distribution between 50 mm~55 mm from the high voltage electrode of the CCFL shown in FIG. 15A.
Figure 15L:
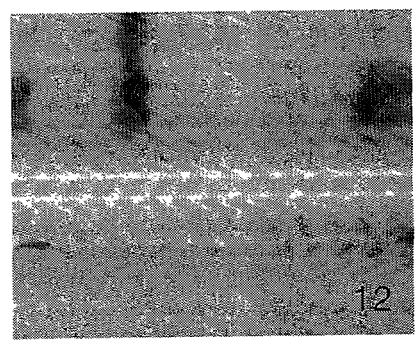
FIG. 15L is a photograph taken of the mercury distribution between 55 mm~60 mm from the high voltage electrode of the CCFL shown in FIG. 15A.
Figure 15M:
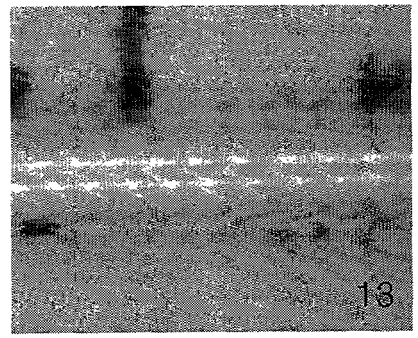
FIG. 15M is a photograph taken of the mercury distribution between 60 mm~65 mm from the high voltage electrode of the CCFL shown in FIG. 15A.
Figure 15N:
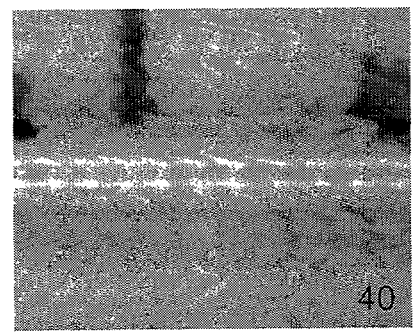
FIG. 15N is a photograph taken of the mercury distribution between 195 mm~200 mm from the high voltage electrode of the CCFL shown in FIG. 15A.
Figure 15O:
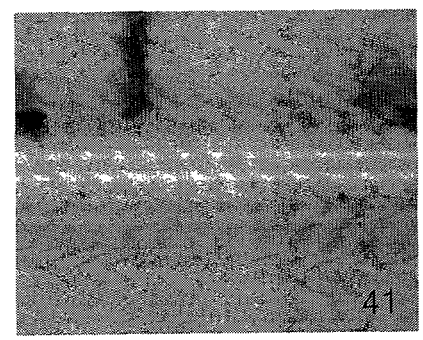
FIG. 15O is a photograph taken of the mercury distribution between 200 mm~205 mm from the high voltage electrode of the CCFL shown in FIG. 15A.
Figure 15P:
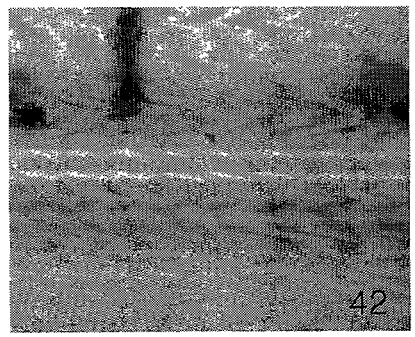
FIG. 15P is a photograph taken of the mercury distribution between 205 mm~210 mm from the high voltage electrode of the CCFL shown in FIG. 15A.
Figure 15Q:
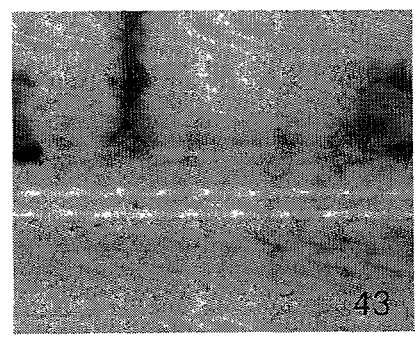
FIG. 15Q is a photograph taken of the mercury distribution between 210 mm~215 mm from the high voltage electrode of the CCFL shown in FIG. 15A.
Figure 15R:
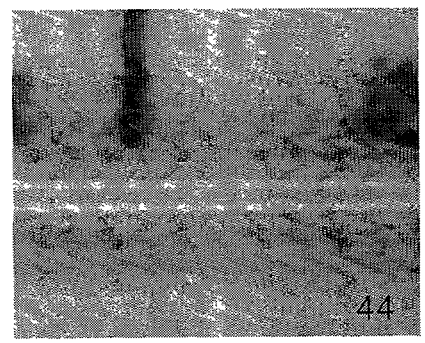
FIG. 15S is a photograph taken of the mercury distribution between 215 mm~220 mm from the high voltage electrode of the CCFL shown in FIG. 15A.
FIG. 15T is a photograph taken of the mercury distribution between 225 mm~230 mm from the high voltage electrode of the CCFL shown in FIG. 15A.
Figure 15S:
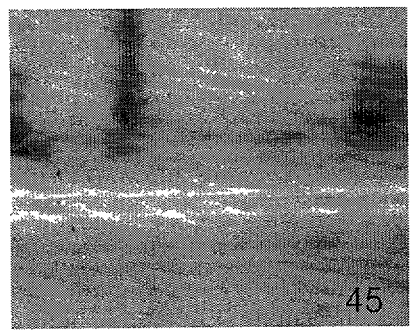
Figure 15T:
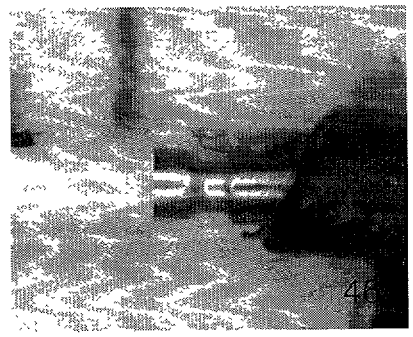

FIGS. 15A to 15T illustrate actual microphotographs of mercury distributions within a CCFL having an overall length is 254 mm and a gap of 5 mm. The black spots inside the CCFL indicate the presence of mercury 13. The CCFL shown in FIGS. 15A-15T was driven for 307 hours by the Burst Mode Inverter output waveform according to the present invention having the PWM frequency of 160 Hz and the duty-on-time to Tp ratio of 38%. Such a mercury distribution may be schematically shown in FIG. 16.

Figure 16:
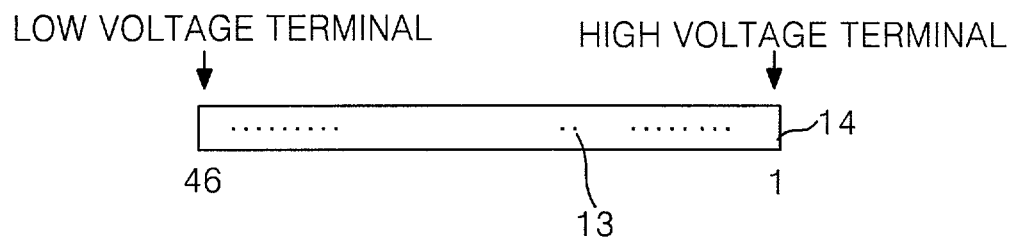
FIG. 16 schematically illustrates a sectional view of the mercury distribution shown in FIGS. 15A to 13T.

As seen in FIGS. 15A to 15T and 16, all the mercury 13 inside the CCFL 12 is uniformly distributed at the area near the high voltage terminal 15A to 15N of the CCFL 12 and the area near the low voltage terminal 15O to 15T. Accordingly, there is no deviation in brightness caused by a gradient in mercury distribution at the area near the high voltage terminal of the CCFL and the area near the low voltage terminal.

Figure 17A:
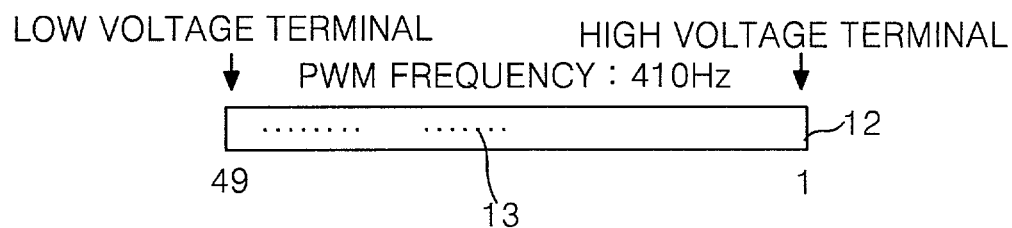
FIG. 17A is a sectional view illustrating mercury distribution in a CCFL source according to a conventional Burst Mode Inverter driving method operating at a PWM frequency of 410 Hz.
Figure 17B:
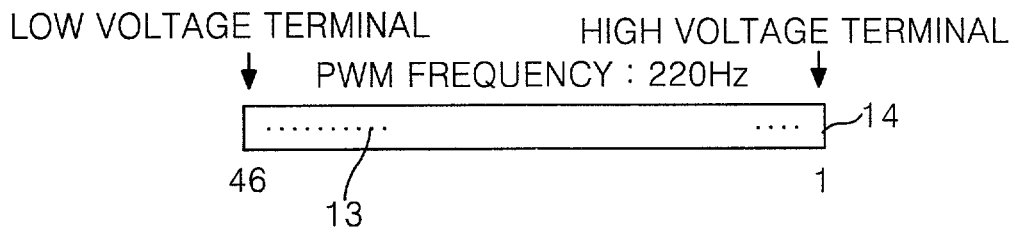
FIG. 17B is a sectional view illustrating the mercury distribution in a CCFL source after 510 hours according to a conventional Burst Mode Inverter driving method operating at a PWM frequency of 280 Hz.
Figure 17C:
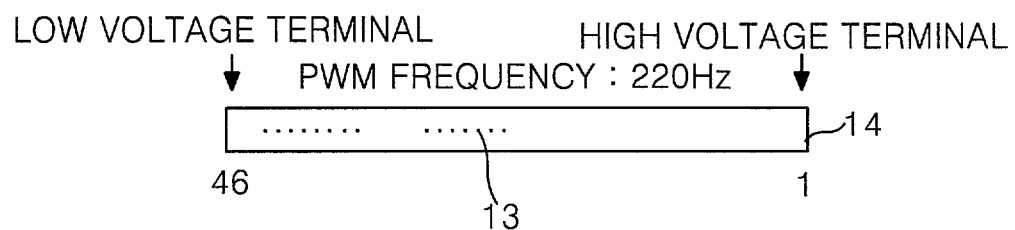
FIG. 17C is a sectional view illustrating the mercury distribution in a CCFL source according to a conventional Burst Mode Inverter driving method operating at a PWM frequency of 220 Hz.

FIG. 17A illustrates the distribution of mercury in a CCFL having been driven for 306 hours by a conventional Burst Mode Inverter having a PWM frequency of 410 Hz. The mercury 13 at the area near the high voltage terminal of the CCFL 14 has migrated to the area towards the center and low voltage terminal of the CCFL. FIG. 17B illustrates the distribution of mercury 13 in a CCFL having been driven from 510 hours by a conventional Burst Mode Inverter having a PWM frequency of 280 Hz. The mercury 13 at the area near the high voltage terminal of the CCFL 14 has migrated to the area near the low voltage terminal of the CCFL. FIG. 17C illustrates the distribution of mercury in a CCFL having been driven for 306 hours by a conventional Burst Mode Inverter having a PWM frequency of 220 Hz. The distribution of mercury 13 at the area near the high voltage terminal of the CCFL 14, has been reduced so much that there has been excessive migration of mercury 13 towards the area near the low voltage terminal of the CCFL.

As seen in FIGS. 17A to 17C, when the CCFL is driven by the conventional Burst Mode Inverter having PWM frequencies of 410 Hz, 280 Hz and 220 Hz, as the PWM frequency gets increases, the mobility of mercury from the high voltage terminal of the CCFL to the low voltage terminal is increased. Likewise, as the CCFL drive time increases, the migration of mercury from the high voltage terminal of the CCFL to the low voltage terminal is increased. These trends induce a deviation in brightness during operation of the CCFL.

Figure 17D:
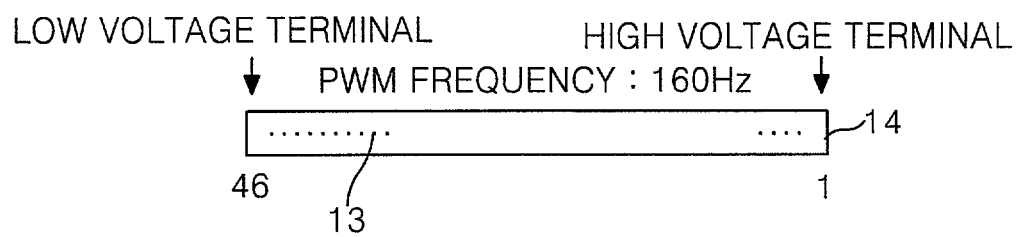
FIG. 17D is a sectional view illustrating the mercury distribution in a CCFL source after 510 hours according to a Burst Mode Inverter driving method in one aspect of the present invention operating at a PWM frequency of 160 Hz.

Referring now to FIG. 17D, mercury distribution at both terminals of a CCFL, having been driven for 510 hours by a Burst Mode Inverter according to the principles of the present invention and having a PWM frequency of 160 Hz, is substantially uniform.

By comparing FIGS. 17A to 17C with 18, optimum CCFL driving conditions obtained from the principles of the present invention include, for example: setting the PWM frequency between about 2.5 times to 3 times the frame frequency used in driving the LCD, and setting the duty-on-time to Tp ratio to between about 50% to 100%. According to the embodiment of the present invention, if the PWM frequency in the output of the Burst Mode Inverter is about three times the frame frequency, the duty-on-time ratio may be adjusted to about 40%. According to one aspect of the present invention, if the PWM frequency in the output of the Burst Mode Inverter is about two times the frame frequency, the duty-on-time to Tp ratio may be adjusted to between about 50% to 100%.

The PWM frequency may be about two to three times the frame frequency used in driving the LCD. For example, the PWM frequency may be about 120 Hz~180 Hz if the frame frequency used in driving the LCD is 60 Hz. In the Burst Mode Inverter output waveform according to the embodiments of the present invention, the duty-on-time may be adjusted to be within the range of 40%-100% of one period of the PWM frequency to yield stable CCFL discharges. By delaying and/or preventing the large scale migration of mercury within the CCFL, brightness may be made more uniform throughout operation of the CCFL.

Figure 18:
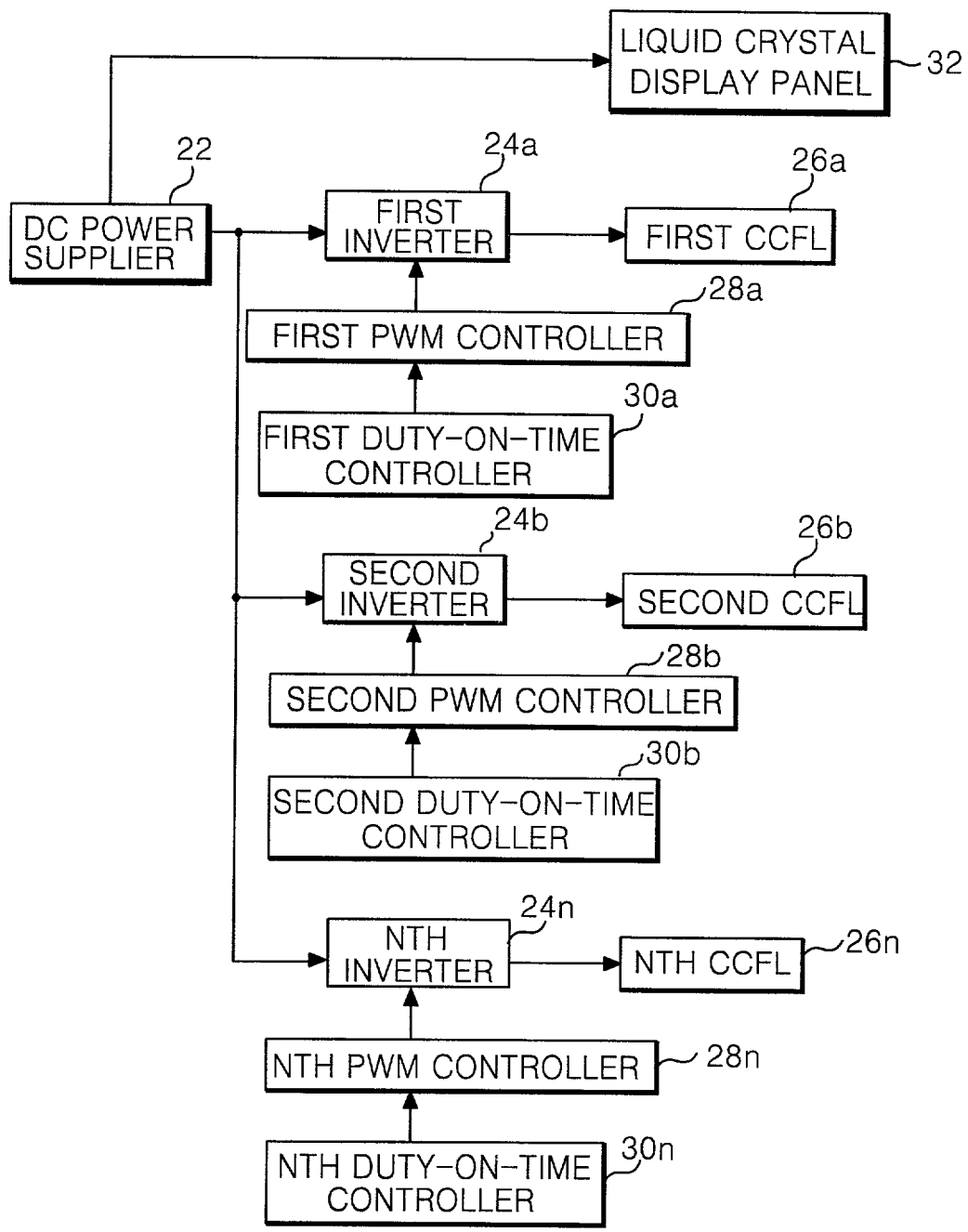
FIG. 18 is a block diagram representing a liquid crystal display having a driving apparatus including a Burst Mode Inverter according to a second embodiment of the present invention.

Referring now to FIG. 18, a driving apparatus according to a second embodiment of the present invention includes a plurality of discharge tube lamps, a DC power supplier 22 supplying DC power, first to $n^{th}$ inverters 24a, 24b, ..., 24n for converting the DC power supplied from a DC power supplier 22 to AC power, first to $n^{th}$ CCFL 26a, 26b, ... 26n for receiving the AC power from the first to $n^{th}$ inverters 24a, 24b, ... 24n and generating light, and first to $n^{th}$ PWM controllers 28a, 28b, ... 28n for controlling the DC power supplied from the DC power supplier 22 to each of the first to $n^{th}$ inverters 24a, 24b, ... 24n by Pulse Width Modulation (PWM) method.

The DC power supplier 22 receives power from a system portion (not shown), generates power for driving a liquid crystal panel, and supplies the generated power to a liquid crystal panel 32. More specifically, the DC power supplier 22 converts the power supplied from the system portion to a voltage type suitable for driving discharge tube lamps and then supplies the converted voltage to each of the first to $n^{th}$ inverters 24a, 24b, ..., 24n.

The liquid crystal panel 32 controls the transmittance of the light that is irradiated from the first to $n^{th}$ CCFLs 26a, 26b, ..., 26n in accordance with video signals applied to a plurality of control switches arranged in a matrix pattern.

Each of the first to $n^{th}$ inverters 24a, 24b, ..., 24n converts the DC power supplied from the DC power supplier 22 to the AC power. The DC power supplied from the DC power supplier 22 is modulated according to a PWM control method imposed by the first to $n^{th}$ PWM controllers 28a, 28b, ..., 28n. A piezo-electric transducer (not shown) for boosting low voltage DC power to the high voltage AC power may be included within each of the first to $n^{th}$ inverters 24a, 24b, ..., 24n. Each of these piezo-electric transducers boost the AC power supplied from the first to $n^{th}$ inverters 24a, 24b, ..., 24n in an amount proportional to a ratio of a primary coil to by the proportion of a number of primary coils and a number of secondary coils, and supplies the boosted AC power to each of the first to $n^{th}$ CCFLs 26a, 26b, ..., 26n.

By the PWM method, each of the first to $n^{th}$ PWM controllers 28a, 28b, ..., 28n controls transistors disposed between the DC power supplier 22 and each of the first to $n^{th}$ inverters 24a, 24b, ..., 24n. Accordingly, each transistor transmits DC power supplied from the DC power supplier 22 to each of the first to $n^{th}$ inverters 24a, 24b, ..., 24n by the control of the first to $n^{th}$ PWM controllers 28a, 28b, ..., 28n. Each of the first to $n^{th}$ PWM controllers 28a, 28b, ..., 28n additionally includes a first to $n^{th}$ duty-on-time controllers 30a, 30b, ..., 30n for controlling the duty proportion of each transistor.

Each of the first to $n^{th}$ duty-on-time controllers 30a, 30b, ..., 30n multiplies a frame frequency of an LCD within a range of about 2 to about 3 times the frame frequency to generate a PWM frequency. Moreover, the each of the duty-on-time controllers adjust the duty-on-time proportion of the PWM frequency to be within the range of about 40% to 100% of one period of the PWM frequency. The adjusted PWM frequency is supplied to each of the first to $n^{th}$ PWM controllers 28a, 28b, . . . , 28n. Each of the first to n$^{th}$ duty-on-time controllers 30a, 30b, . . . , 30n may be integrated into each of the first to n$^{th}$ PWM controllers 28a, 28b, . . . , 28n.

Each of the first to n$^{th}$ CCFLS 26a, 26b, . . . , 26n receives the boosted AC power supplied from the secondary coil of the piezo-electric transducer, produces a gas discharge, and emits light.

The discharge tube lamps may be driven according to a driving method that includes supplying the DC power from the DC power supplier 22 via the transistors under the control of the first to n$^{th}$ PWM controllers 28a, 28b, . . . , 28n to each of the first to n$^{th}$ inverters 24a, 24b, . . . , 24n.

The DC power supplied via each transistor is converted to AC power by each of the first to n$^{th}$ inverters 24a, 24b, . . . , 24n, the AC power may be boosted by the ratio of the numbers of primary and secondary coils within the piezo-electric transducers integrated within the inverters. Electrons supplied via the boosted AC power and the mercury within the CCFLs collide with each other in the CCFLs and UV light, resultant of chemical reactions such as ionization of mercury, excitation, etc., is emitted.

Accordingly, a plurality of CCFLs receive AC power within the frequency range required to be driven by Burst Mode Inverters having their PWM frequencies multiplied within the range of about two to about three times the frame frequency used in driving the LCD and duty-on-time ratios within the range of about 40% to 100% of one period of the PWM frequency, as described above. By delaying and/or preventing the large scale migration of mercury within the CCFLs, brightness may be made more uniform throughout operation of the CCFLs.

As described above, the apparatus and method of driving the discharge tube lamp and the liquid crystal display using the same, according to embodiments of the present invention, multiplies the PWM frequency of the Burst Mode Inverter by about two to about three times the frame frequency used in driving the LCD, and sets up the proportion of the duty-on-time in relation to one period of the PWM frequency as about 40% to 100%. By this, it is delayed and/or prevented that the mercury of the discharge tube lamp moves from the high voltage terminal to the low voltage terminal, thereby making the brightness uniform.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A driving apparatus having a discharge tube lamp, comprising:
   a DC power supplier for producing DC power;
   a burst mode inverter for converting the DC power to AC power, wherein the inverter responds to a Pulse Width Modulation frequency to modulate the DC power to produce the AC power, wherein the AC power is pulse width modulated; and
   a controller for generating the Pulse Width Modulation frequency and adjusting a duty-on-time of the Pulse Width Modulation frequency in the range of about 40% to 99%,
   wherein the controller multiplies a frame frequency to generate the Pulse Width Modulation frequency, and wherein the controller adjusts the duty-on time of the Pulse Width Modulation frequency to be within 40% and 99% of one period of the Pulse Width Modulation frequency.

2. The driving apparatus according to claim 1, further comprising at least one discharge tube for being driven by AC power supplied from the inverter.

3. The driving apparatus according to claim 1, wherein the controller receives the frame frequency and adjusts the Pulse Width Modulation frequency to be between 2 and 3 times the frame frequency.

4. The driving apparatus according to claim 1, wherein the duty-on-time of the Pulse Width Modulation frequency is 40% and the Pulse Width Modulation frequency is three times the frame frequency.

5. The driving apparatus according to claim 1, wherein the duty-on-time of the Pulse Width Modulation frequency is in the range of 50% to 99% and the Pulse Width Modulation frequency is twice the frame frequency.

6. A driving method of a discharge tube lamp, comprising:
   producing DC power;
   generating a Pulse Width Modulation frequency and adjusting a duty-on-time of the Pulse Width Modulation frequency in the range of about 40% to 99%; and
   utilizing the Pulse Width Modulation frequency to convert the DC power into AC power to be applied to the discharge tube lamp, wherein the AC power is pulse width modulated;
   wherein generating the Pulse Width Modulation frequency includes multiplying a frame frequency to generate the Pulse Width Modulation frequency, and adjusting the duty-on time of the Pulse Width Modulation frequency to be within 40% and 99% of one period of the Pulse Width Modulation frequency.

7. The driving method according to claim 6, wherein adjusting the generated Pulse Width Modulation frequency includes adjusting the Pulse Width Modulation frequency to be 2 to 3 times the frame frequency in response to the signal.

8. The driving method according to claim 7, wherein the duty-on-time is in the range of 50% to 99% and the Pulse Width Modulation frequency is twice the frame frequency.

9. The driving method according to claim 7, wherein the duty-on-time of the Pulse Width Modulation frequency is 40% and the Pulse Width Modulation frequency is three times the frame frequency.

10. A liquid crystal display, comprising:
    a liquid crystal display panel;
    a DC power supplier for producing DC power;
    a burst mode inverter for converting the DC power to AC power, wherein the inverter responds to a Pulse Width Modulation frequency to modulate the DC power to produce the AC power, wherein the AC power is pulse width modulated;
    a controller for generating the Pulse Width Modulation frequency and adjusting a duty-on-time of the Pulse Width Modulation frequency in the range of about 40% to 99%; and
    at least one discharge tube which turns on in accordance with the AC power supplied from the inverter to irradiate light to the liquid crystal display panel,
    wherein the controller multiplies a frame frequency to generate the Pulse Width Modulation frequency, and wherein the controller adjusts the duty-on time of the Pulse Width Modulation frequency to be within 40% and 99% of one period of the Pulse Width Modulation frequency.

11. The liquid crystal display according to claim 10, wherein controller receives the signal having the frame frequency, and wherein the Pulse Width Modulation frequency is adjusted to be within the range of 2 to 3 times the frame frequency.

12. The liquid crystal display according to claim 10, wherein the duty-on-time of the Pulse Width Modulation frequency is 40% and the Pulse Width Modulation frequency is three times the frame frequency.

13. The liquid crystal display according to claim 10, wherein the duty-on-time of the Pulse Width Modulation frequency is in the range of 50% to 99% and the Pulse Width Modulation frequency is twice the frame frequency.

14. The driving apparatus according to claim 1, wherein the adjusted Pulse Width Modulation frequency is about 2.5 times the frame frequency.

* * * * *